United States Patent [19]

Sugino et al.

[11] Patent Number: 5,796,198

[45] Date of Patent: Aug. 18, 1998

[54] ELECTRIC MOTOR FOR A POWER STEERING APPARATUS

[75] Inventors: Mitsutaka Sugino, Wako; Tadao Kodaira, Maebashi; Tugio Onodera, Sawa-gun, all of Japan

[73] Assignees: Honda Giken Kogyo Kabushiki Kaisha, Tokyo; Mitsuba Corporation, Gunma-ken, both of Japan

[21] Appl. No.: 533,201

[22] Filed: Sep. 25, 1995

[30] Foreign Application Priority Data

Sep. 27, 1994 [JP] Japan .................. 6-231906

[51] Int. Cl.$^6$ .................. H02K 5/00; H02K 5/24; H02K 7/06
[52] U.S. Cl. .................. 310/89; 310/51; 310/83
[58] Field of Search .................. 310/51, 89, 50, 310/47, 83

[56] References Cited

U.S. PATENT DOCUMENTS

| Re. 32,222 | 8/1986 | Drutchas | 180/79.1 |
|---|---|---|---|
| 3,651,839 | 3/1972 | Stihl et al. | 143/32 R |
| 4,335,077 | 6/1982 | Santiago et al. | 422/179 |
| 4,344,921 | 8/1982 | Santiago et al. | 422/179 |
| 4,432,943 | 2/1984 | Musall et al. | 422/179 |
| 4,450,373 | 5/1984 | Miller et al. | 310/51 |
| 5,015,897 | 5/1991 | Inagaki et al. | 310/83 |
| 5,041,751 | 8/1991 | Yokuzuku | 310/239 |
| 5,159,221 | 10/1992 | Miyazaki et al. | 310/239 |
| 5,194,769 | 3/1993 | Ade et al. | 310/51 |
| 5,440,186 | 8/1995 | Forsell et al. | 310/239 |

FOREIGN PATENT DOCUMENTS 59-50864 3/1984 Japan.

*Primary Examiner*—Steven L. Stephan
*Assistant Examiner*—Michael J. Wallace, Jr.
*Attorney, Agent, or Firm*—Birch, Stewart, Kolasch & Birch, LLP

[57] ABSTRACT

An electric motor used in an electric type power steering apparatus and the like, wherein a magnetic field unit outer casing 14 for encasing a magnetic field unit 7 comprising magnets 5 and an armature 6, is formed integral and concentric with a motor yoke 3, and a power supply unit outer casing 15 for encasing a commutator 22 and brushes 27 of a power supply unit 8, having a protruding portion 15a protruding from an axially concentric outer peripheral face thereof arranged eccentric to the magnetic field unit outer casing 14, is formed integral with the motor yoke 3. As a result, the influence of shock from the outside is suppressed, and accommodating space for the power supply unit ensured, so that long motor life is possible.

15 Claims, 4 Drawing Sheets

ELECTRIC MOTOR FOR A POWER STEERING APPARATUS

BACKGROUND OF THE INVENTION

1. Field of the Invention

The present invention relates to an electric motor for a power steering apparatus, ideally suited to a power steering unit or four wheel steering unit, mounted on a vehicle.

2. Description of the Related Art

One type of so called power steering mechanism for assisting a vehicle steering force, is the electric motor type mechanism disclosed for example in Japanese Patent Application First Publication No. 59-50864. With this mechanism, opposite ends of a driven shaft are connected to the vehicle wheels, and rotation of the steering shaft is converted to reciprocal motion by means of a rack and pinion to thereby steer the wheels, the driven shaft being assisted by the output of an electric motor. The motor comprises a motor yoke forming a casing with magnets fixed to an inner peripheral portion, and an armature rotatably provided inside the yoke in close proximity to the magnets. Rotational drive from the armature reciprocally drives the driven shaft by way of a ball screw mechanism.

With the above conventional electric motor when fitted to a vehicle, if subjected to an external shock, the shock is applied directly to the motor yoke. Therefore, to avoid damage to the internal magnets and the armature, the motor yoke must have a high rigidity. Moreover, to increase motor output the simplest way is to increase the motor size. However there are problems with this due to constraints being placed on the maximum diameter of the motor yoke to avoid interference with surrounding parts when mounted in a vehicle.

Furthermore, if the power supply to the armature is by way of brush contact, then the life of the motor can be extended by having long brushes extending radially outwards.

Therefore with the conventional motor, the brushes are made to protrude from the motor yoke and are encased in a metal sleeve. With such a construction, the brushes can be reliably lengthened. However, forming the aperture in the motor yoke for the brush protrusions takes time and labor, and there is also the problem with an increase in the number of parts for fitting the metal sleeve. In the case of motors using disk type brushes, large diameter brushes are preferred so as to extend the brush life by increasing the contact face area between the brush and the commutator, and thus reduce the current and minimize the face pressure. However, for same reasons as mentioned above, the size of the motor cannot be increased.

The present invention takes into consideration the above situation with the object of providing an electric motor for a power steering apparatus wherein the influence of shock from the outside can be suppressed, and accommodating space for the power supply section can be ensured, so that long motor life is possible.

SUMMARY OF THE INVENTION

According to a first aspect of the present invention, an electric motor for a power steering apparatus comprises; a cylindrical motor yoke, an armature shaft positioned inside the motor yoke substantially concentric therewith and connected to a steering apparatus, a magnetic field section fitted to an inner peripheral portion of the motor yoke, and a power supply section for supplying power to the armature, wherein a protruding portion which protrudes from an axially concentric outer peripheral face of the motor yoke is formed integral with the motor yoke at at least one location.

According to a second aspect of the present invention, an electric motor for a power steering apparatus comprises: a cylindrical motor yoke, an armature shaft positioned inside the motor yoke substantially concentric therewith and connected to a steering apparatus, a magnetic field unit fitted to an inner peripheral portion of the motor yoke, and a power supply unit for supplying power to the armature, wherein a magnetic field unit outer casing for encasing the magnetic field unit is formed integral and concentric with the motor yoke, and a power supply unit outer casing for encasing at least a part of the power supply unit, having a protruding portion protruding from an axially concentric outer peripheral face thereof eccentric to the magnetic field unit outer casing, is formed integral with the motor yoke.

With the present invention when mounted for example on a vehicle, the protruding portion formed on the motor yoke contacts against the surrounding parts, or during running, against the ground and the like. Consequently, shock due to the contact is applied first to the protruding portion and dampened, and is not transmitted directly to the internal mechanism, thus avoiding damage thereto. Moreover, if the protruding portion is made the power supply unit outer casing arranged eccentric to the magnetic field unit outer casing, then damage to the particularly delicate magnetic field unit can be prevented. Furthermore, interference with surrounding parts can be avoided, and the accommodating space for the power supply unit increased, so that long motor life is possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A description of embodiments according to the present invention is given hereunder with reference to the drawings.

Figure 1:
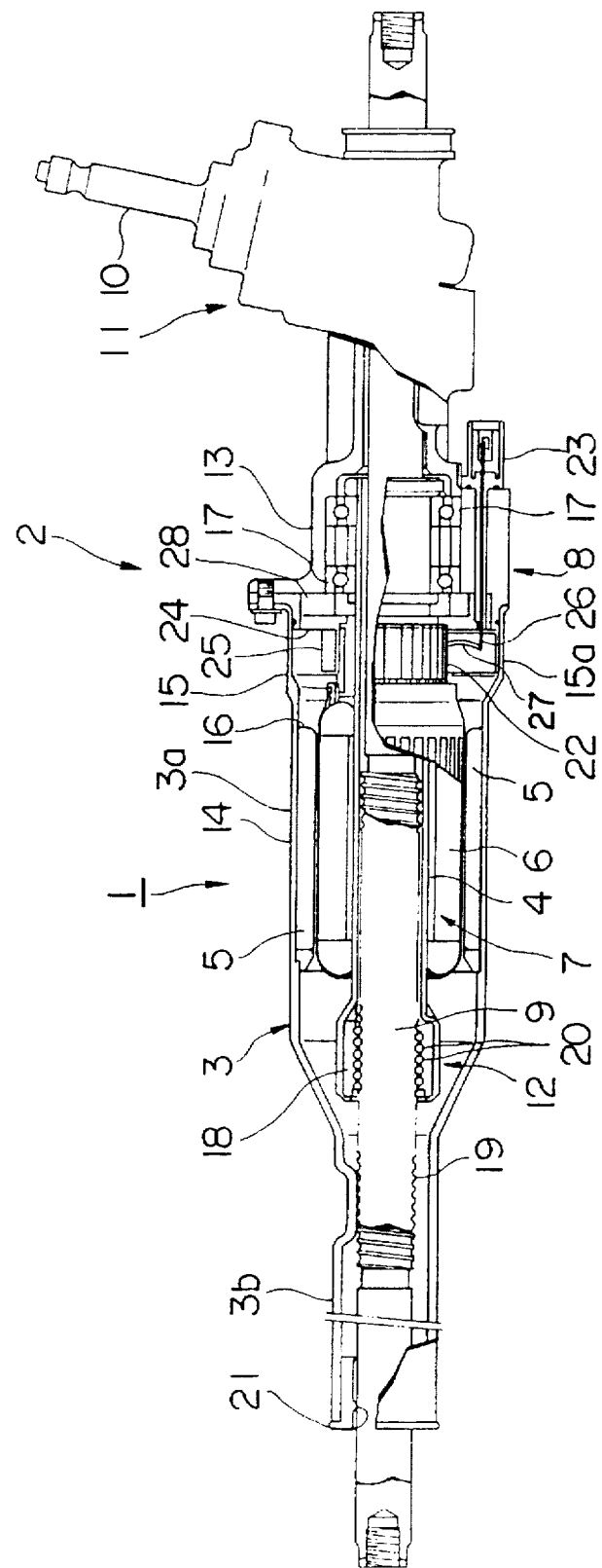
FIG. 1 is a partially cutaway side sectional view of a power steering mechanism to which a motor according to a first embodiment of the present invention is applied.

FIG. 1 shows the main components of a rack and pinion type power steering mechanism 2 which is driven by a motor 1 (power steering apparatus electric motor) according to a first embodiment of the present invention. The motor 1 comprises a cylindrical motor yoke 3, a cylindrical armature shaft 4 positioned inside the motor yoke 3 and coaxial therewith, a magnetic field unit 7 comprising magnets 5 fitted to an inner peripheral portion of the motor yoke 3 together with an armature core 6 fitted to an outer peripheral portion of the armature shaft 4, and a power supply unit 8 for supplying power to the armature core 6.

A driven shaft 9 passes through the armature shaft 4. The output shaft of a torque sensor unit 11 for detecting the rotational torque of an input shaft 10 of a steering unit, is connected to one end (right end in FIG. 1) of the driven shaft 9 by means of a rack and pinion. A ball screw mechanism 12 provided integral with the armature shaft 4, is engaged with the other end (left end in FIG. 1) of the driven shaft 9.

The motor yoke 3 is formed from a cylindrical steel tube of approximately constant thickness, with a yoke portion 3a on the right half for accommodating the magnetic field unit 7 and the power supply unit 8, and a tubular portion 3b on the left half formed integral therewith, for enclosing the ball screw mechanism 12 and the driven shaft 9. The right end opening of the motor yoke 3 is covered by a housing 13 which encloses the part connecting the output shaft of the torque sensor unit 11 to the driven shaft 9. The yoke portion 3a comprises a magnetic field unit outer casing 14 for encasing the magnetic field unit 7, and a power supply unit outer casing 15 formed integral therewith at one end, for encasing the power supply unit 8.

Magnets 5 which constitute the field poles of the field device 7 are arranged at a plurality of circumferentially spaced locations on the inner peripheral portion of the magnetic field unit outer casing 14 of the yoke portion 3a, secured together by means of a cylindrical magnet cover 16. The armature shaft 4 is supported at one end by means of a double bearing 17 so as to be freely rotatable within the housing 13. A nut portion 18 of the ball screw mechanism 12 is fixed to the other end of the armature shaft 4.

The ball screw mechanism 12 is of a general commonly known construction comprising the nut portion 18, a screw portion 19 formed around the periphery of the driven shaft 9, and a plurality of balls 20 disposed between the nut portion 18 and the screw portion 19. The driven shaft 9 is supported inside the motor yoke 3 by way of the nut portion 18 and a ring 21 is engaged with the inner periphery of the tubular portion 3b near the end opening, so as to be free to reciprocate axially while being restrained from rotation.

A commutator 22 of the power supply unit 8 is secured close to the housing 13 end of the armature core 6. The power supply unit 8 comprises the commutator 22, a coupler 23 fixedly mounted to the housing 13, a brush holder stay 24 and stay cover 25 supporting brushes 27 electrically connected with the coupler 23, a terminal 26 passing through the coupler 23, and brushes 27 acting as electrical contact points for contacting with the outer peripheral face of the commutator 22, fixed to the end of the terminal 26. A connector (not shown in the figure) for electrical supply, is removably fitted to the coupler 23.

A retainer 28 is contacted with the outer ring 17a (fixed side) of the bearing 17, is disposed between the commutator 22 and the bearing 17, with the brush holder stay 24 secured to an upper side thereof.

Figure 2:
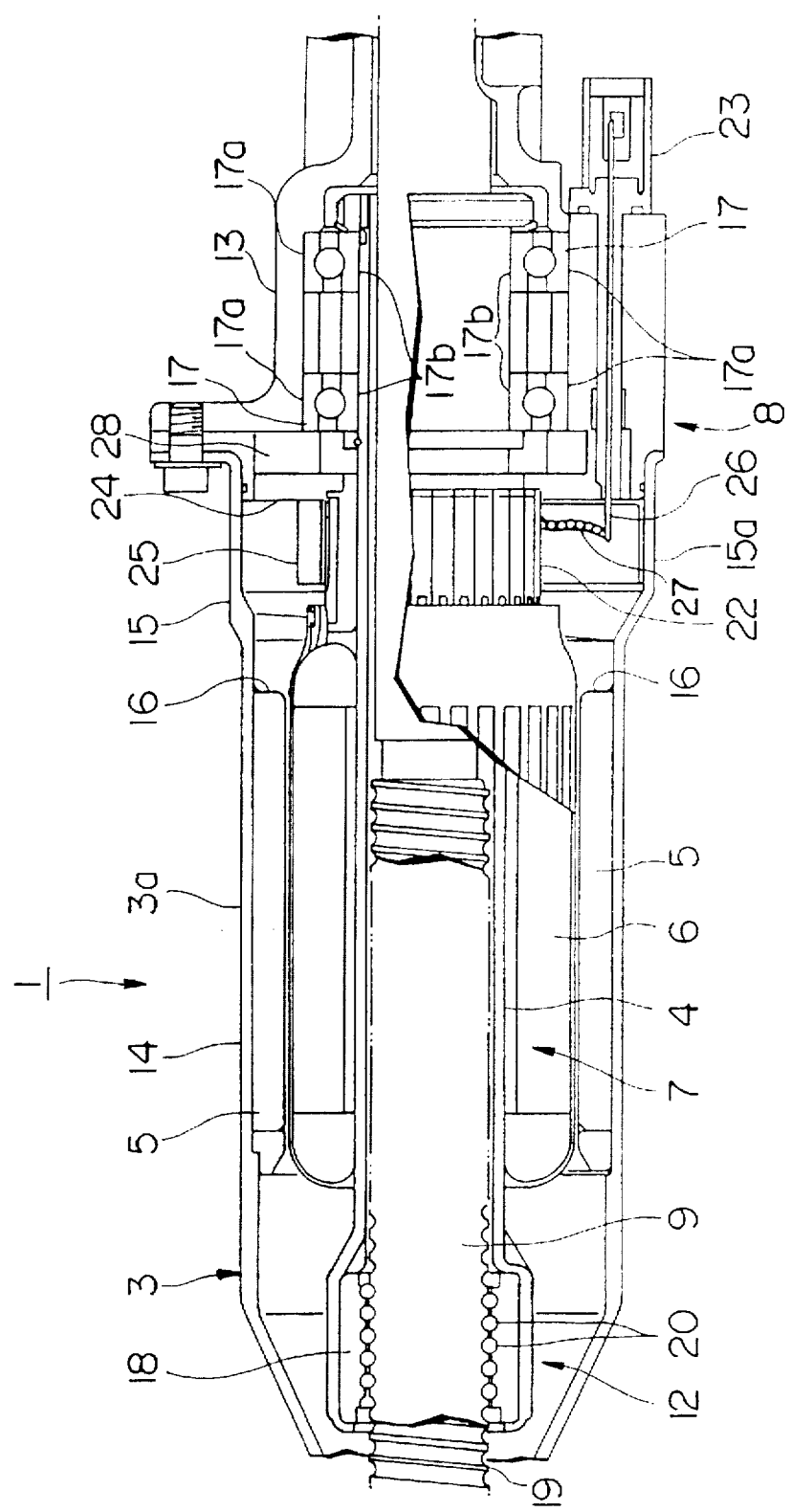
FIG. 2 is an enlarged view of the main parts of FIG. 1.
Figure 3:
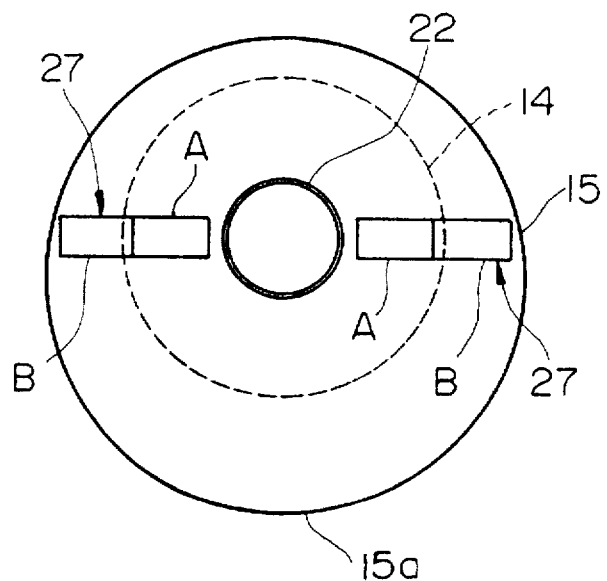
FIG. 3 is a schematic front elevation view of a magnetic field unit outer casing and a power supply unit outer casing of the motor yoke.

As shown in FIG. 2, the commutator 22, the brush holder stay 24, the stay cover 25, the end of the terminal 26, and the brush 27 which all constitute the power supply unit 8, are encased by the power supply unit outer casing 15 of the yoke portion 3a. The power supply unit outer casing 15, as shown in FIG. 3 is formed with a larger diameter than that of the magnetic field unit outer casing 14, and is arranged eccentric thereto so as to form a downwardly protruding portion 15a.

The operation of the motor 1 of the above construction will now be described.

At the time of steering, the input shaft 10 is rotated and the driven shaft 9 moves in a direction corresponding to the rotation. At this time, the steering torque sensor unit 11 operates and power is supplied to the commutator 22 from the terminal 26 of the coupler 23 by way of the brush 27. As a result, the magnetic lines of force of the armature core 6 cut the magnetic field of the magnets 5 causing the driven shaft 9 to rotate so that the nut portion 18 formed integral therewith rotates. When the nut portion 18 rotates, movement of the driven shaft 9 due to the steering operation is augmented by operation of the ball screw mechanism 12. That is to say, the steering operation is power assisted.

With the motor 1 of the present embodiment constructed as described above and fitted to a vehicle, if there is interference between the motor 1 and surrounding parts, or the motor 1 is grazed by an obstacle on the ground, the protruding portion 15a of the power supply unit outer casing 15 of the motor yoke 3 is contacted first. Accordingly, shock due to the contact is not directly transmitted to the magnets 5 or the armature core 6 of the magnetic field unit 7, so that the likelihood of damage to these is minimal. Thus, the shock resistance of the motor 1 is improved, and a drop in performance due to shock is avoided.

Moreover, since only the power supply unit outer casing 15 is made eccentric in a downwards direction, then clearances with parts surrounding the magnetic field unit outer casing 14 can be maintained, enabling an increase in the degree of freedom in mounting the motor yoke 3 in a vehicle. Furthermore, if the accommodating space for the power supply unit 8 is made wider, the brush 27 can be lengthened. That is to say, referring to FIG. 3, if the diameter of the power supply unit outer casing 15 is the same as that of the magnetic field unit outer casing 14, then the effective length of the brush can only be within the range shown by A. On the other hand, by making the power supply unit outer casing 15 with a larger diameter arranged eccentrically as with the present embodiment, the effective length is increased to A+B. Accordingly, the accommodating space for the power supply unit can be increased without excessive modification or an increase in the number of components, so that the life of the motor can be extended. Moreover, the power supply unit outer casing 15 functions as a cover for the lead-out portion of the coupler 23, and also as a collecting region for powder worn from the brushes 27.

Figure 4:
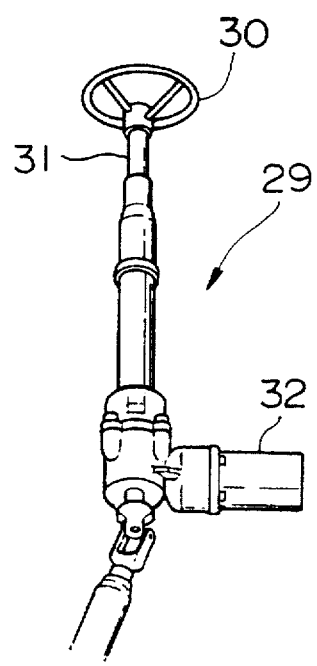
FIG. 4 is a perspective view of a part of a column assist type steering mechanism on which the motor of another embodiment according to the present invention is mounted.
Figure 5:
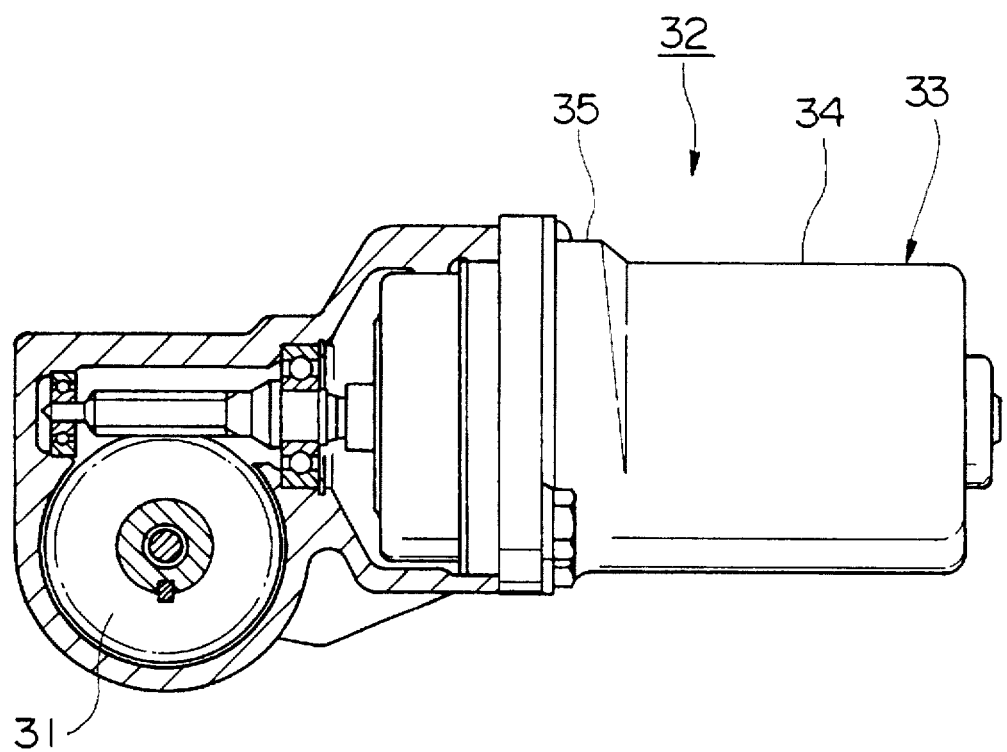
FIG. 5 is a partially cutaway side view of the motor of FIG. 4.

As well as the above described first embodiment, the present invention is also applicable to a column assist type power steering mechanism 29 as shown in FIG. 4. In FIG. 4 numeral 30 indicates a steering wheel, numeral 31 indicates a steering input shaft while numeral 32 indicates a motor. The motor 32 as shown in FIG. 5, is for assisting the rotation of the steering input shaft 31, and comprises a magnetic field unit outer casing 34 and a power supply unit outer casing 35 formed integral with a motor yoke 33. The power supply unit outer casing 35 is formed with a larger diameter than that of the magnetic field unit outer casing 34 and is arranged eccentric thereto in a upwards direction in FIG. 5.

In this case, particularly when mounting the motor 32 in a vehicle, even if surrounding components are contacted (for example the accelerator brake pedal, or air conditioning ducting), since the power supply unit outer casing 35 is contacted first, then damage for example to the internal magnetic field unit (not shown) and the resultant effects can be avoided.

The present invention is also applicable to brushless motors with a power supply unit which does not use brushes. In this case, the field unit has the armature core secured to the outer casing of the field unit, and the magnets secured to the shaft, while the power supply unit has a circuit board comprising a power supply device and a position detecting device fitted to the housing. Since with this arrangement the attachment space can be increased as with the protruding portion of the yoke, then the degree of freedom in layout of circuit board design is improved.

The present invention can also be applied to an electric motor of a rear wheel steering unit having the same basic construction and attachment environment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric motor housing for a power steering apparatus which protects a magnetic field unit of an electric motor from injury, comprising:

a magnetic field unit outer casing encasing the magnetic field unit;

a power supply unit outer casing encasing at least part of a power supply unit and being located adjacent to one end of said magnetic field unit outer casing; and an annular protruding portion radially protruding from a concentric outer peripheral surface of said magnetic field unit outer casing;

said annular protruding portion integrally formed with said power supply unit outer casing and said magnetic field unit outer casing;

said annular protruding portion protecting the magnetic field unit from injury.

2. The electric motor housing according to claim 1, said annular protruding portion eccentrically disposed with respect to said magnetic field unit outer casing.

3. The electric motor housing according to claim 1, said annular protruding portion eccentrically disposed toward a side of said electric motor which is most likely to be subjected to outside impacts.

4. An electric motor housing for a power steering apparatus, comprising:

a magnetic field unit outer casing adapted to house an armature and adapted to house a magnetic field unit fitted to an inner peripheral portion of said magnetic field unit outer casing;

a power supply unit outer casing adapted to encase at least a part of a power supply section for supplying power to the armature, said power supply unit outer casing being located adjacent to one end of said magnetic field unit outer casing, wherein said magnetic field unit outer casing includes a first outer peripheral face and said power supply unit outer casing includes a second outer peripheral face; and a protruding portion radially protruding from said first outer peripheral face of said magnetic field unit outer casing and connecting said magnetic field unit outer casing to said second outer peripheral face of said power supply unit outer casing, wherein said first outer peripheral face of said magnetic field unit outer casing is eccentric with respect to said second outer peripheral face of said power supply unit outer casing.

5. The electric motor housing according to claim 4, wherein said magnetic field unit outer casing, said power supply unit outer casing, and said protruding portion are integrally formed.

6. The electric motor housing according to claim 4, wherein said second outer peripheral face of said power supply unit outer casing is eccentric toward a side of said electric motor housing which is most likely to be subjected to outside impacts.

7. The electric motor housing according to claim 6, wherein said side of said electric motor housing which is most likely to be subjected to outside impacts is a downwardly facing side of said electric motor housing when said electric motor housing is installed.

8. The electric motor housing according to claim 4, wherein said first outer peripheral face of said magnetic field unit outer casing is circular and said second outer peripheral face of said power supply unit outer casing is circular.

9. An electric motor for a power steering apparatus, comprising:

a magnetic field unit outer casing;

an armature shaft positioned inside said magnetic field unit outer casing;

at least one electrical conductor wound about said armature;

a commutator attached to said armature and electrically connected to said at least one electrical conductor;

a magnetic field unit fitted to an inner peripheral portion of said magnetic field unit outer casing;

a power supply unit for supplying power to said commutator;

a power supply unit outer casing encasing at least a part of said power supply unit, and being located adjacent to one end of said magnetic field unit outer casing, wherein said magnetic field unit outer casing includes a first outer peripheral face and said power supply unit outer casing includes a second outer peripheral face; and a protruding portion radially protruding from said first outer peripheral face of said magnetic field unit outer casing and connecting said magnetic field unit outer casing to said second outer peripheral face of said power supply unit outer casing, wherein said first outer peripheral face of said magnetic field unit outer casing is eccentric with respect to said second outer peripheral face of said power supply unit outer casing.

10. The electric motor according to claim 9, wherein said magnetic field unit outer casing, said power supply unit outer casing, and said protruding portion are integrally formed.

11. The electric motor according to claim 9, wherein said second outer peripheral face of said power supply unit outer casing is eccentric toward a side of said electric motor which is most likely to be subjected to outside impacts.

12. The electric motor according to claim 11, wherein said side of said electric motor which is most likely to be subjected to outside impacts is a downwardly facing side of said electric motor when said electric motor is installed.

13. The electric motor according to claim 9, wherein said power supply unit includes brushes for contacting said commutator.

14. The electric motor according to claim 9, wherein said power supply unit includes a circuit having power supply means for supplying power to said commutator and position detecting means for detecting a position of said armature.

15. The electric motor according to claim 9, wherein said first outer peripheral face of said magnetic field unit outer casing is circular and said second outer peripheral face of said power supply unit outer casing is circular.

* * * * *